W. R. ELMENHORST.
BONE-BLACK KILN.

No. 188,006.  Patented March 6, 1877.

3 Sheets—Sheet 2.

Witnesses:
Mary L. Adams.
Edw.d Payson

Inventor:
Walter R. Elmenhorst
Per Edw. E. Trumby
Atty.

W. R. ELMENHORST.
BONE-BLACK KILN.

No. 188,006.

3 Sheets—Sheet 3.

Patented March 6, 1877.

Witnesses:
Mary L. Adams
Edw. Payson

Inventor:
Walter R. Elmenhorst
Per Edw. E. Quimby
Atty.

UNITED STATES PATENT OFFICE.

WALTER R. ELMENHORST, OF JERSEY CITY, NEW JERSEY.

IMPROVEMENT IN BONE-BLACK KILNS.

Specification forming part of Letters Patent No. 188,006, dated March 6, 1877; application filed February 1, 1877.

*To all whom it may concern:*

Be it known that I, WALTER R. ELMENHORST, of Jersey City, New Jersey, have invented certain Improvements in Kilns for Revivifying Bone-Black, of which the following is a specification:

My improvements relate to vertical-pipe kilns, and are applicable to kilns composed of vertical pipes or retorts, whether such retorts are heated wholly externally, or are heated internally by means of inner heating-pipes, or are heated both internally and externally; and my invention consists, primarily, in establishing lateral openings in the upper portion of each retort, and in providing such openings with external guard-flanges. The object of the openings is to allow for the discharge of steam from the bone-black contained in the retort, and the object of the guard-flanges is to prevent the escape of bone-black from the lateral openings.

My invention further includes the establishment in the kiln of a separate chamber or flue, having a suitable outlet through which the steam driven out of the bone-black is discharged.

There are a variety of modes of constructing the lateral openings in the retorts and their guard-flanges; but I regard it as the preferable method to make the upper portion of each retort, where the openings are to be provided, of a series of short cup-flanged cylinders, conforming to the size and shape of the retort in cross-section, and having openings in their perimeters, so that when they are set one within the other they form a longitudinal continuation of the retort. This mode of construction, which also constitutes a feature of my invention, enables me to provide conveniently for the repair or readjustment of a retort, which may have been too much expanded longitudinally by heat. When thus expanded one of the short cylinders of which I have spoken may be removed, and thus the excessive elongation of the retort may be compensated for, and the retort, as a whole, be reduced to the desired length.

Figure 1:
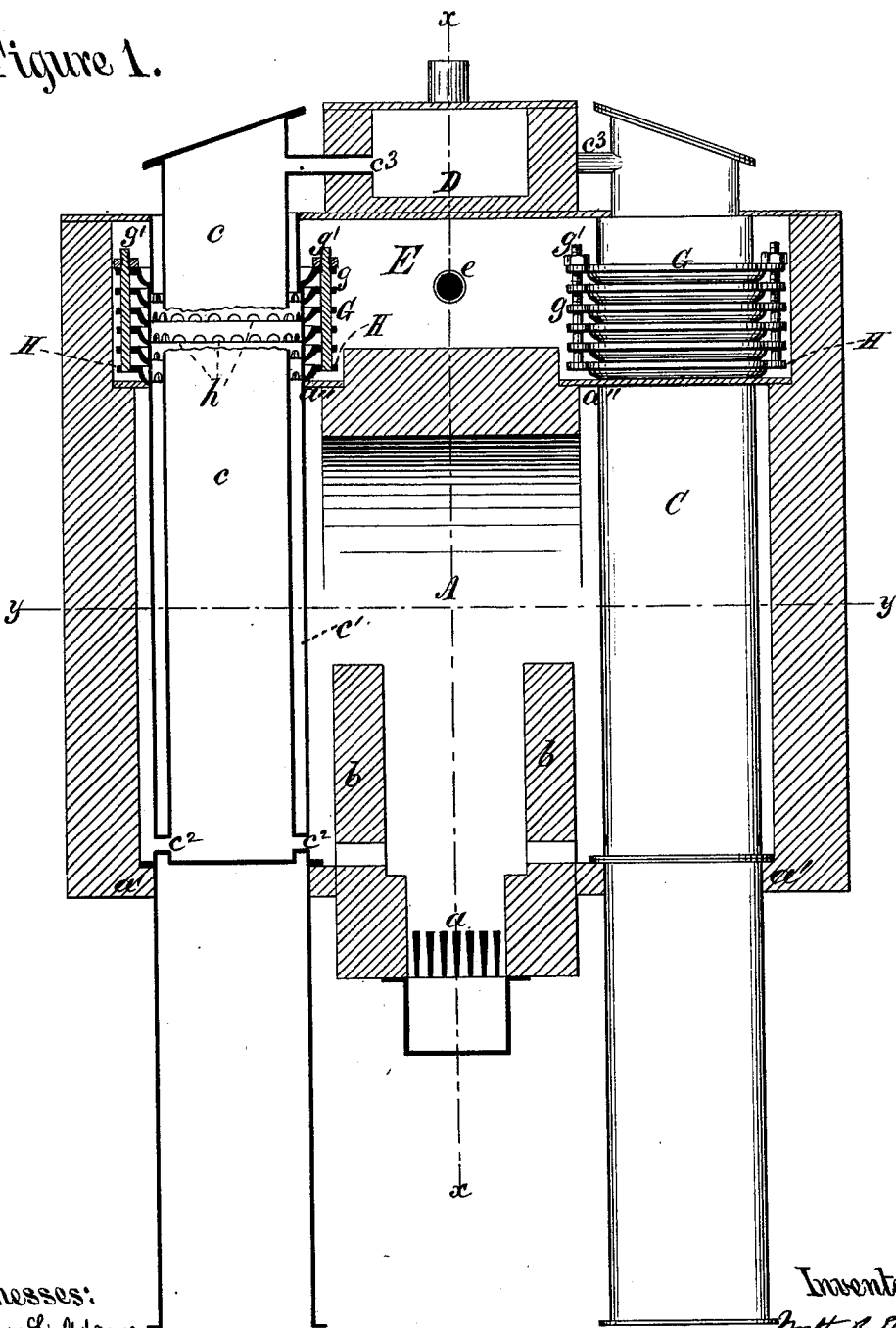
Figure 2:
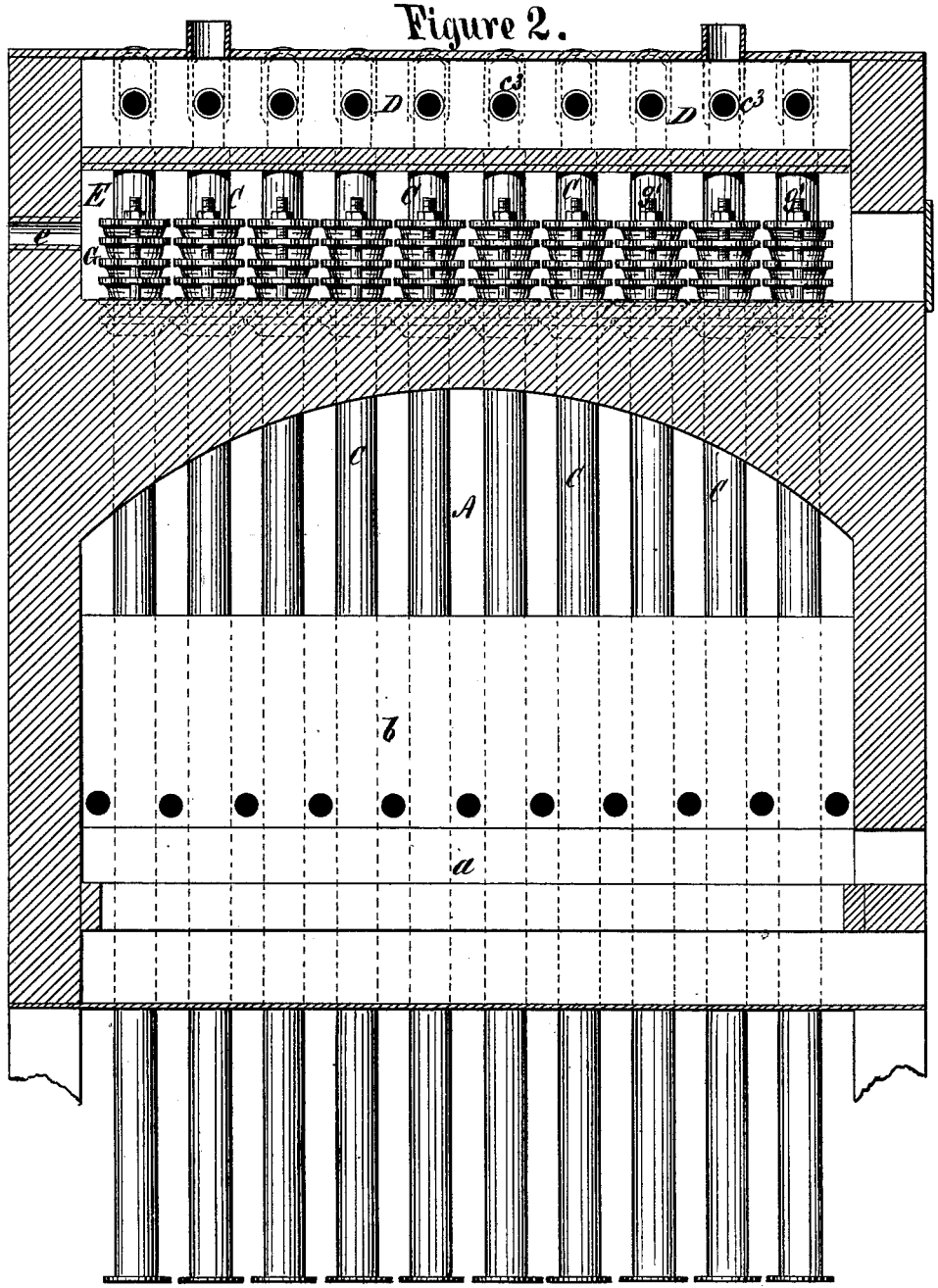
Figure 3:
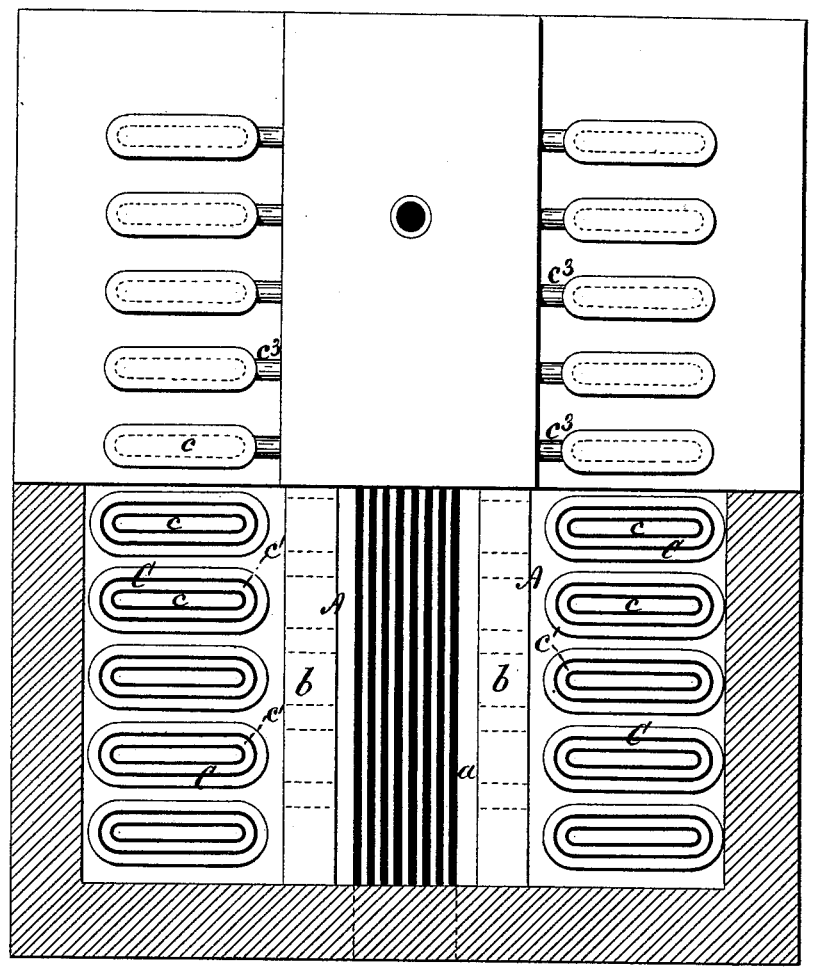
Figure 4:
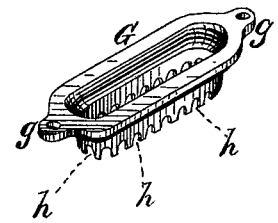

The accompanying drawings are as follows: Figure 1 is a transverse vertical section of a kiln, showing one of the retorts in central vertical section. Fig. 2 is a longitudinal vertical section through the line $x\,x$ on Fig. 1. Fig. 3 is a top view of one half of the kiln, and a transverse horizontal section of the other half, through the line $y\,y$ on Fig. 1. Fig. 4 is a perspective view of one of the sections of which the upper portion of the retorts are composed.

The structure shown in the drawings consists of a furnace or heating-chamber, A, provided with a central grate, $a$, upon the surface of which the fuel is retained by the bridge-walls $b\,b$. In the sides of this furnace-chamber are two series of vertical retorts, C C, projecting downward through the bottom $a'\,a'$ of the heating-chamber, and also upward through the ceiling $a''\,a''$ of the heating-chamber. These retorts are flattened tubes, and that portion of each retort which is above the bottom of the heating-chamber contains an inner pipe, $c$, of like shape to the retorts, but smaller in size, leaving an annular space, $c^1$, between the retort and the inner pipe. This annular space is for containing the bone-black which is to be revivified. The inner pipes are connected at the bottom with the heating-chamber by means of the short tubes $c^2$, and are connected at their upper ends, by means of the tubes $c^3$, with the central flue D. The heated currents and gaseous products of combustion fill the heating-chamber A, from the lower part of which they escape, through the small tubes $c^2$, into the inner pipe $c$, by which they are conducted upward to the tubes $c^3$, through which they pass into the central flue D, from which they are carried to the chimney, where they are finally discharged.

I have thus described that portion of the structure which is old, for the purpose of facilitating the explanation of my improvements.

By reference to the drawings, it will be seen that above the heating-chamber A there is another chamber, E, between the roof of the kiln and the top of the heating-chamber A. The inner pipes $c$ are lengthened sufficiently to pass through the chamber E, and upward to a suitable height to permit of their connection, by means of the lateral pipes $c^3$, with the central flue D. The retorts C also extend through the chamber E, but terminate at the top of the chamber, thus affording at that point the usual opening for charging the annular spaces between the retorts and their inner pipes with bone-black. That portion of the retorts which is contained within the chamber E is provided with several series of lateral openings, $h$, for the purpose of affording an outlet from the retort for the steam driven out of the bone-black by the application of heat. This steam is received into the chamber E and discharged therefrom through the outlet $e$. To prevent the escape of bone-black through the lateral openings it is necessary to provide flanges projecting outward and upward from the side of the retort immediately under the opening.

The necessary protecting or guard flanges for the openings may be conveniently provided by constructing the upper portion of the retort in short cup-flanged sections G, one of which is shown in perspective in Fig. 4. Each of these sections is provided with two or more projecting lugs, $g$, which are perforated for the reception of a vertical bolt, $g'$, by means of which the sections, when placed one within the other, are bolted to similar lugs H, projecting laterally from the upper end of the retort C. The perimeters of the sections G are provided with the openings $h$. The openings $h$ in each section permit the escape of steam from the bone-black contained in the retort, while the bone-black is prevented from escaping by reason of the series of openings in each section being surrounded on the outside by flanges projecting upward and outward from the next lower section.

It occasionally happens, in this kind of kiln, that that portion of the retort which is immediately exposed to the fire expands so as to become permanently elongated. When this is the case I open the top of the kiln and remove the uppermost of the series of short sections G, and am thus enabled to conveniently effect a compensation for the excessive elongation of the retort without the necessity of removing the retort itself, or seriously disarranging the structure for the purpose of readjusting the expanded retort in position.

I claim as my invention, in a kiln for drying bone-black, substantially such as described—

1. The chamber E, provided with the outlet $e$, in combination with one or more retorts passing through the chamber E, and provided with the lateral openings $h$.

2. The retort C, provided with the openings $h$ on its outside, as and for the purposes set forth.

3. The retort C, having the openings $h$, in combination with the guard-flanges projecting outward and upward from the side of the retort, substantially as and for the purpose set forth.

4. A vertical retort composed for a portion of its length of a series of two or more short sections, G, longitudinally bolted together by the bolts and nuts $g$ and $g'$, substantially as shown.

WALTER R. ELMENHORST.

Witnesses:
   EDWD. PAYSON,
   M. L. ADAMS.